(12) United States Patent
Azizullah et al.

(10) Patent No.: US 11,611,612 B2
(45) Date of Patent: Mar. 21, 2023

(54) LINK QUALITY MEASUREMENTS AND LINK STATUS DETECTION

(71) Applicant: Verizon Patent and Licensing Inc., Arlington, VA (US)

(72) Inventors: Hamid U. Azizullah, Ashburn, VA (US); Akhil Dayal, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 40 days.

(21) Appl. No.: 16/693,604

(22) Filed: Nov. 25, 2019

(65) Prior Publication Data

US 2021/0160310 A1 May 27, 2021

(51) Int. Cl.
*H04L 67/1008* (2022.01)
*H04L 43/08* (2022.01)
*H04L 67/1014* (2022.01)
*H04L 67/1027* (2022.01)
*H04L 67/02* (2022.01)

(52) U.S. Cl.
CPC .......... *H04L 67/1008* (2013.01); *H04L 43/08* (2013.01); *H04L 67/02* (2013.01); *H04L 67/1014* (2013.01); *H04L 67/1027* (2013.01)

(58) Field of Classification Search
CPC ..... H04L 67/1008; H04L 43/08; H04L 67/02; H04L 67/1014; H04L 67/1027
USPC ........................................................ 709/223
See application file for complete search history.

(56) References Cited

U.S. PATENT DOCUMENTS

| | | | |
|---|---|---|---|
| 9,270,480 B1* | 2/2016 | Som de Cerff | H04L 41/344 |
| 9,444,718 B2* | 9/2016 | Khakpour | H04L 43/50 |
| 9,807,629 B1* | 10/2017 | Varlakov | H04W 24/04 |
| 2006/0064478 A1* | 3/2006 | Sirkin | H04L 29/12783 709/223 |
| 2013/0272146 A1* | 10/2013 | Jones | H04L 43/50 370/252 |
| 2014/0157057 A1* | 6/2014 | Fishaimer | G06F 11/3664 714/38.1 |
| 2015/0109940 A1* | 4/2015 | Okhravi | H04L 43/0888 370/252 |
| 2015/0339216 A1* | 11/2015 | Wade | G06F 11/3668 714/38.1 |
| 2017/0155569 A1* | 6/2017 | Chinnaswamy | H04L 41/12 |
| 2017/0373984 A1* | 12/2017 | Sarapure | H04L 43/0894 |
| 2020/0250074 A1* | 8/2020 | Zhang | G06F 11/3688 |

* cited by examiner

*Primary Examiner* — Nicholas R Taylor
*Assistant Examiner* — Chong G Kim

(57) ABSTRACT

A network device may include a processor. The processor is configured to: receive a network address of a load balancer device from a management device; send a test request to the load balancer device based on the received network address; obtain a network address of a data collector device from the load balancer device; and perform a test with the data collector device. The data collector device is configured to: obtain a result of the test; and send the result to a data lake.

20 Claims, 9 Drawing Sheets

FIG. 7

| TEST METHOD | DELIVERY | IMPACT |
|---|---|---|
| HTTP 702 | POST/GET FOR UPLOAD AND DLOWNLOAD | INTRUSIVE |
| TCP 704 | TCP SEGMENT EXCHANGES | SEMI-INTRUSIVE |
| UDP 706 | UDP PACKET EXCHANGES | HIGHLY INTRUSIVE |
| TCP TMT 708 | MINIMUM NO OF PACKETS | NON-INTRUSIVE |
| UDP TMT 710 | PACKET MARKINGS AND JITTER | NON-INTRUSIVE |

| PARAMETER | TYPE |
|---|---|
| MAC ADDRESS 802 | UNSIGNED INT |
| IP ADDRESS 804 | STRING |
| ONT ID 806 | UNSIGNED INT |
| OLT ID 808 | UNSIGNED INT |
| GWR ID 810 | UNSIGNED INT |
| DOWNLOAD 812 | STRING |
| UPLOAD 814 | STRING |
| BOM 816 | DATE AND TIME |
| EOM 818 | DATE AND TIME |
| SEND BUFFER 820 | UNISGNED INT |
| RECEIVE BUFFER 822 | UNSIGNED INT |
| PACKETS SENT 824 | UNSIGNED INT |
| PACKETS RECEIVED 826 | UNSIGNED INT |
| DIRECTION 828 | STRING |
| STATUS 830 | STRING |
| LATENCY 832 | UNSIGNED INT |

LINK QUALITY MEASUREMENTS AND LINK STATUS DETECTION

BACKGROUND INFORMATION

To satisfy the needs and demands of users of mobile and non-mobile communication device users, providers of communication services continue to improve available services. One aspect of such improvements includes determining user Quality of Experience (QoE) and various network performance parameters, such as key performance indicators (KPIs).

Some parameters can be determined at a particular network element and/or within a portion of the network. For example, a base station may be able to determine signal-to-noise ratios of its wireless signals, throughputs, network traffic, etc.

BRIEF DESCRIPTION OF THE DRAWINGS

FIG. 7 illustrates a table of exemplary tests that may be performed by an endpoint and the corresponding data collector of FIG. 1; and FIG. 8 illustrates exemplary parameters that a data collector of FIG. 1 sends to the data lake of FIG. 1.

DETAILED DESCRIPTION OF PREFERRED EMBODIMENTS

The following detailed description refers to the accompanying drawings. The same reference numbers in different drawings may identify the same or similar elements.

As described herein, a Platform and Infrastructure for Measurement (PIM) system provides network diagnostics and measurement capabilities. The capabilities include providing an overview of all network elements connected to a core network and automatically measuring and reporting on the network quality and link status of each node.

The PIM addresses a number of problems that many network service providers face. Some of the problems occur during day-to-day tasks to activate, verify, and troubleshoot data circuits in a production environment. The problems stem from, for example, issues such as:

(1) The currently existing applications for verifying subscriber speeds and isolating data related issues need to be triggered by a technician or a customer in order to verify the speeds of the circuit.

(2) Packet loss, latency and throughput values can only be measured during an active test. However, because there are no appropriate recordings of these test values, there are no reference points to go back and validate an issue that has started or determine its impact on the services.

(3) With currently available testing applications, multiple login screens, tools and devices must be used to identify potential issues for different network elements, such as an Optical Network Terminal or Optical Network Translator (ONT), an Optical Line Terminal (OLT), a Gateway Router (GWR), etc.

(4) With currently available testing applications, a comparison of one circuit to another must be done manually through different portals and it is not easy to make correlations between similar issues for different customers on the same passive optical network (PON).

(5) The current applications do not provide graphical representations of the issues in the network responsible for service impacting changes, and network operators must manually identify the issues and correlate them to a working circuit. This process can take several hours to just identify the problem of high packet loss or excessive latency.

(6) The currently available applications do not provide visual representation of the detected issues, for any of the connected hops/elements, so that they can be easily spotted for automated recovery process.

(7) There is no system that can generate end-to-end network status reports for the operators.

Figure 1:
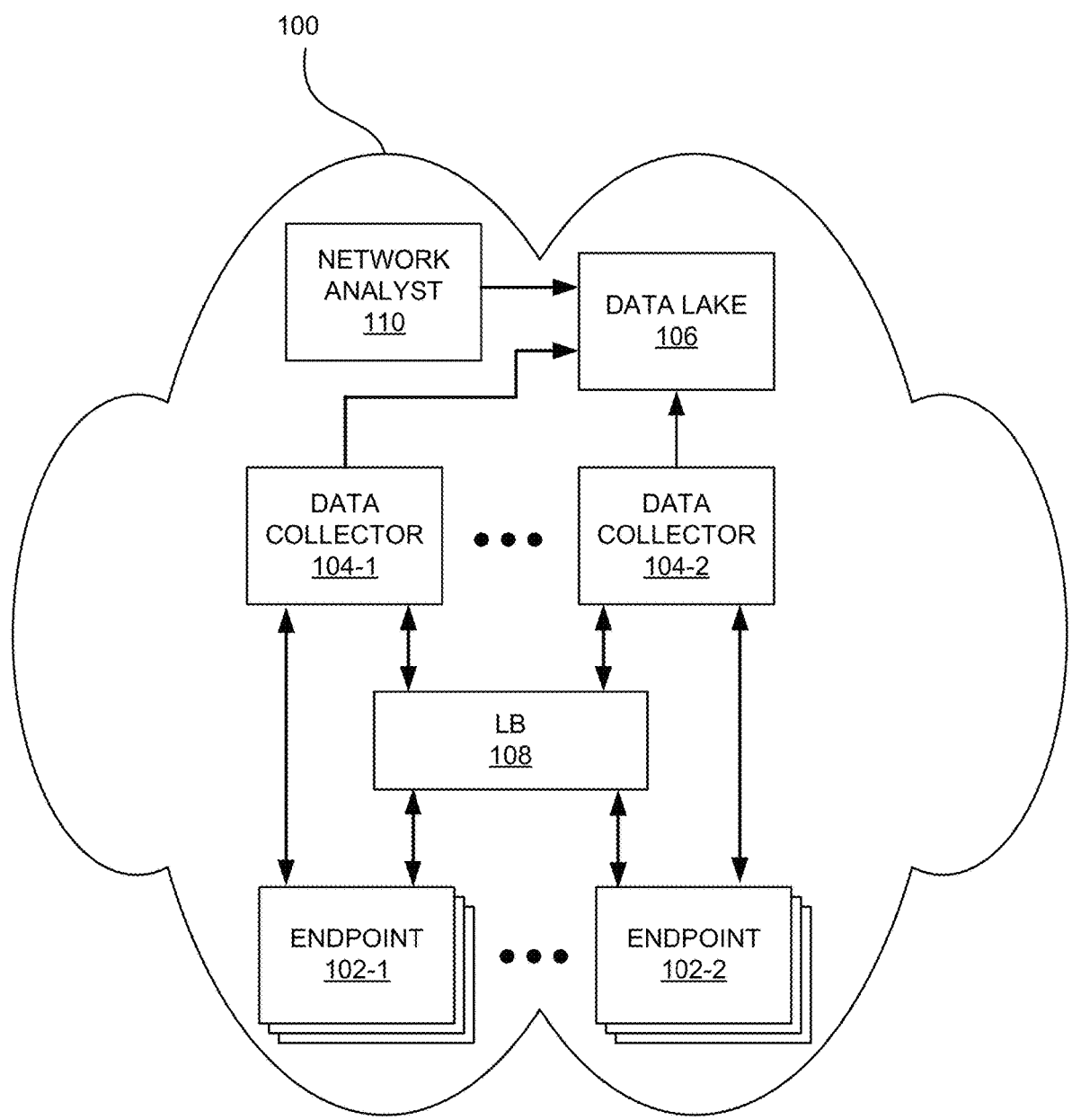
FIG. 1 illustrates an exemplary network environment in which the components of the Platform and Infrastructure for Measurement (PIM) may be implemented.

To address the above-listed and other issues, the PIM provides network access and reachability reports and alerts/alarms on network status to the operators. FIG. 1 illustrates an exemplary network environment in which such a PIM may be implemented. As shown, the network environment includes a network 100. Network 100 in turn includes endpoints or clients 102-1 and 102-2 (collectively referred to as endpoints 102 or clients 102), data collectors or servers 104-1 and 104-2 (collectively referred to as data collectors 104 or servers 104), a data lake 106, a load balancer 108, and a network analyst 110. The PIM includes network components 102-110.

Network 100, which may also be referred to as a provider network 100, may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, a Long Term Evolution (LTE) network (e.g., 4th Generation (4G) network), a 5th Generation (5G) network, an ad hoc network, a telephone network (e.g., the Public Switched Telephone Network (PSTN) or a cellular network), an intranet, or a combination of networks. Provider network 100 may allow the delivery of Internet Protocol (IP) services to various customer devices, such as mobile devices (e.g., smart phones), Customer Premises Equipment (CPE), etc., and may interface with other external networks, such as a packet data network. In some implementations, provider network 100 may include one or more packet data networks.

A packet data network may include a network that supports Internet Protocol (IP)-based communications. A packet data network may include, for example, an IP Multimedia Subsystem (IMS) network, which may provide voice and multimedia services.

Endpoint 102 includes a software agent responsible for generating packets and transmitting them to a respective data collector 104 or for receiving packets from data collector 104. A typical endpoint 102 may be installed on a user device, such as a Broadband Home Router (BHR), a Gateway Router (GWR), or another CPE device that is located in the customer premises.

Endpoint 102 may be implemented in low level languages, such as C or assembly, for speed and a small footprint. In some implementations, endpoint 102 may adhere to the Portable Operating System Interface (POSIX) standard for its management function. Examples of the management function includes: the activate client function and the deactivate client function.

When the activate client function is invoked for a particular endpoint 102, the endpoint 102 may send a test request message to load balancer 108, to obtain a network address of a particular data collector 104 to which the endpoint 102 is assigned. Upon receipt of the address from load balancer 108, the endpoint 102 may instantiate a connection to the assigned data collector 104 and begin collecting test parameter values in accordance with its schedule. In one implementation, an active endpoint 102 may perform the tests periodically (e.g., every 60 seconds).

During a test, an endpoint 102 may transmit and receive packets to and from data collector 104 to accurately measure the theoretical throughputs for downloads and uploads, latency, round trip times (RTTs), packet loss, a retransmission rate, etc. If an endpoint 102 obtains network statistics, the endpoint 102 may transmit them to the data collector 104. In many tests, endpoint traffic may not adversely impact customer services or the CPE performance. During a test, if a packet is lost, the endpoint 102 may retransmit the lost packet.

When the deactivate client function is invoked for a particular endpoint 102, the endpoint 102 may complete ongoing tests and abandon scheduled tests. Thereafter, the endpoint 102 may return to the disabled state, until the endpoint 102 receives another call to return to the active state through either a system call (e.g., an Operating System (OS) call at the device on which endpoint 102 is installed) or an Application Programming Interface (API) call from remote hosts.

In addition to supporting the management functions, an endpoint 102 may also provide APIs or mechanisms for setting a number of parameters that are needed to perform tests. Such parameters include, for example: a port number of the data collector 104 assigned to the endpoint 102 (e.g., port 9000); a test location identifier (ID), which may be assigned by an Operations Support System (OSS); an Optical Network Terminal/Translator (ONT) ID; an Optical Line Terminal (OLT) ID; a Gateway Router (GWR) ID; a test protocol (e.g., Transport Control Protocol (TCP), User Datagram Protocol (UDP), Hypertext Transport Protocol (HTTP); Secure File Transfer Protocol (SFTP), etc.); a results port, which is the port of the data collector 104 assigned to the endpoint 102 for uploading the test results. These parameters are described below with reference to FIG. 2B and FIG. 8.

For bookkeeping purposes, endpoint 102 may maintain a rotating log. The endpoint 102 may not allow the log to accumulate over a certain limit, depending on the CPE device capacity and available storage. In the logs, the endpoint 102 may record its status, transmission dates and times, port numbers that it uses, the address of the data collector 104 assigned to the endpoint 102, errors or warnings related to its status, etc.

Data collector 104 may include logical components to calculate the values of performance metrics, convert them into a human readable format, and forward the results to data lake 106 that houses all critical network related parameter values from individual endpoints 102. Data collector 104 may also have the ability to manage Service Level Agreements (SLAs) for endpoints 102. Values of SLA-related variables are determined on a periodic basis; and alerts and notifications are generated and sent to network operators through network analyst 110 if SLAs are violated.

In some implementations, data collector 104 may be implemented/developed in Java and deployed on bare metal hardware strategically located in network 100 (e.g., at the edge). In operation, when data collector 104 is contacted by an endpoint 102, data collector 104 may place the endpoint 102 in the active queue, to indicate that the endpoint 102 is reachable and is ready to start a test.

When endpoint 102 is ready to start a test, endpoint 102 may send a request to establish a connection to the data collector 104. When data collector 104 receives the request and the testing begins, data collector 104 may record the endpoint 102's status as "testing," to indicate that the endpoint 102 is active and running. Thereafter, data collector 104 may collect packets in real time and extract values of parameters such as a packet size, time, latency, a throughput (per upload and download) and any other parameters defined in the SLA. When transmitting, data collector 104 may mark packets with a common identifier based on the type of device from which the packets are generated. During a test, data collector 104 may use the first packet and the last packet from an endpoint 102 to determine whether the endpoint 102 is reachable.

Data collector 104 may collect data from an endpoint 102 until instructed otherwise by the network operator or until the endpoint 102 stops responding. At such times, the data collector 104 may probe the endpoint 102 at regular time intervals (e.g., every 60 seconds). With every consecutive failed attempt to obtain a response from the endpoint 102, however, data collector 104 may double the probing time interval. After a threshold number of attempts, the data collector 104 may place the endpoint 102 in the inactive queue. Data collector 104 may record each of its attempts to probe the endpoint 102.

Upon placing the endpoint 102 in the inactive queue, the data collector 104 may not further probe the endpoint 102, until the endpoint 102 sends a message to the data collector 104. In response to the message, the data collector 104 may move the endpoint 102 from the inactive queue to the active queue. The data collector 104 may then resume its calculations of the parameter values for the endpoint 102. The data collector 104 may present the endpoint 102 status and its historical data to the operator via network analyst 110, via the data lake 106. The parameter values may be in a text format, such as the JavaScript Object Notation (JSON), the YAML Ain't Markup Language (YAML), or the Extensible Markup Language (XML).

In some implementations, a data collector 104 may determine the network status of an endpoint 102 based on the first packet or series of packets transmitted from the endpoint 102 within a single collection period. During its own transmission to an endpoint 102, if a packet is lost, the data collector 104 may retransmit the lost packet.

Like an endpoint 102, a data collector 104 may maintain a rotating log. The data collector 104 may limit its log size below a particular threshold (e.g., 1 MB), depending on its storage capacity and availability. In the logs, data collector 104 may record an endpoint status, transmission dates and times, port numbers, endpoint addresses, and errors or warnings.

Data lake 106 may include a database of parameter values received from data collectors 104. In one implementation, the database may include unstructured data arranged in a table for each endpoint 102 registered with a data collector 104. Prior to accepting data from a data collector 104, however, data lake 106 may first onboard the data collector 104 over a predetermined messaging bus. At data lake 106, data for each data collector 104 may be identified by the data collector hostname, its IP address, a port associated with the data collector 104, and/or another type of identifier specified by network analyst 110. These identifiers may be used to aggregate data from a single endpoint 102, even if the data was collected by different data collectors 104.

Data lake 106 may accept different network API calls from data collectors 104 to receive data. For example, data collectors 104 may invoke RESTful APIs when uploading data to data lake 106 in the JSON format.

Load balancer 108 may include logic for assigning a particular data collector 104 to each endpoint 102. In assigning a data collector 104, load balancer 108 may take into consideration various factors, such as data collector 104 loads, network traffic, delay, etc. to evenly balance the loads over multiple data collectors 104. Each endpoint 102 may be provided with a load balancer network address, which the endpoint 102 may use to send a request to the load balancer 108 to have the load balancer 108 assign a data collector 104 to the endpoint 102. In response, the load balancer 108 may provide a network address of the data collector 104 assigned to the endpoint 102.

Network analyst (NA) 110 may include logic to provide visual representations of the data from data collectors 104 (e.g., via a web interface). In one implementation, a single instance of network analyst 110 may service all operators of network 100; and another instance of network analyst 110 may serve as a backup. In other implementations, network analyst 110 may include additional instances, for example, to increase processing efficiency.

In some implementations, network analyst 110 may render a geographical map of the city, the state and the country overlaid with data collector 104 images at appropriate locations on the map. Alternatively, network analyst 110 may display the data in a tabular format.

When presenting data along with the map, network analyst 110 may indicate the health status of each connected endpoint 102 (e.g., different colors represent different health levels). Likewise, if an endpoint 102 has violated an SLA, network analyst 110 may indicate the presence of the violation through different colors (e.g., green endpoint 102 to indicate that the endpoint 102 has not violated the SLA; a yellow endpoint 102 to indicate that one or more of the SLA conditions have been violated and to indicate that the values of the parameters associated with the SLA violations are available based on the last data collection; and a red endpoint 102 to indicate that all SLA conditions have been violated and that the endpoint 102 may be offline.

In addition to color coding the status of network elements, network analyst 110 may provide visual warnings based on collected data. For example if an SLA for latency is violated at one or more endpoints 102, network analyst 110 may generate visual alerts. Furthermore, based on the level of impact the violation has on network 100, network analyst 110 may contact the operator (e.g., send emails or text messages or place calls to the operator). Network analyst 110 may provide a high-level daily report on connection status for endpoints 102 and data collectors 104 and on quality of links for all regions. Network analyst 110 may export the report in the Portable Document Format (PDF), Comma Separated Values (CSV) format, or the PowerPoint Presentation (PPT) format, etc. If an endpoint 102 has a problem, network analyst 110 may indicate the problem and/or steps to resolve the problem; and provide an easy-to-identify warnings to the operators.

Because network analyst 110 is coupled to data lake 106 and all data collectors 104 in network 100 send their data to data lake 106, a network operator may examine any data collector 104 and/or endpoint 102 data by using network analyst 110. Network analyst 110 may also provide views of historical data and/or statistical information for a particular endpoint 102. Network analyst 110 may display data even for an endpoint 102 that is in the inactive state, until the endpoint 102 is disconnected from network 100 or is not detectable from within network 100.

When network analyst 110 displays a data collector 104, network analyst 110 may offer options for the operator to expand data collector 104 details, to view information related to endpoints 102 that sent data to the data collector 104. When the view is expanded, network analyst 110 may display results of ongoing endpoint tests as well as historical data. Network analyst 110 may indicate the next scheduled test times, as well as the last test results (e.g., completed, failed or inconclusive) in a color coded format.

Network analyst 110 may also allow the user to visually inspect the number of tests performed by an endpoint 102 and provide grid/or chart options for further analysis. Once the endpoint 102 responds to its assigned data collector 104, the status indicated at network analyst 110 may reflect the changes at the endpoint 102.

In addition to providing visual representations of test results, network analyst 110 may provide mechanisms for controlling network elements, such as endpoints 102, data collectors 104, devices hosting the endpoints 102 or data collectors 104, load balancer 108, etc. More specifically, network analyst 110 may provide functions to connect to and manage different network elements, such as, for example Optical Line Terminals, Gateway Routers, and other elements in network 100. In addition, network analyst 110 may provide the standard set of REST APIs for queries, status checks or configuration of the network elements.

Depending on the implementation, network environment 100 may include additional, fewer, different, or a different arrangement of components than those illustrated in FIG. 1 (e.g., routers, switches, etc.). For example, although not illustrated, network environment 100 may include additional 4G, 5G, or another type of network components.

Figure 2A:
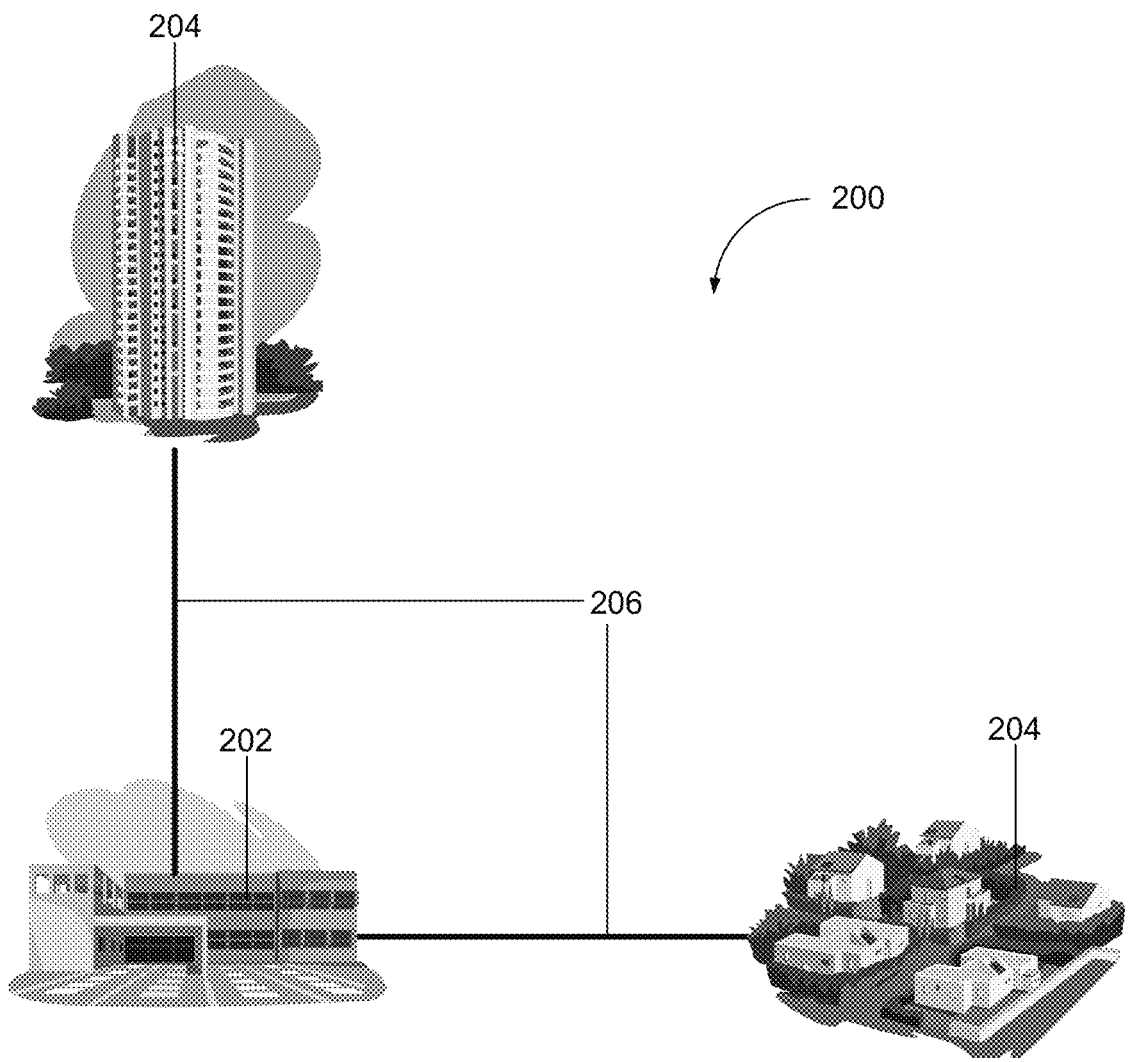
FIG. 2A depicts an exemplary portion of the network of FIG. 1.

FIG. 2A depicts an exemplary portion 200 of network 100 of FIG. 1. The depiction includes physical level network elements of network 100. As shown, network portion 200 (also referred to as network 200) may include a central office 202, dwelling units 204, and feeder optical fiber cables 206. An actual network 200 may include additional, fewer, or different dwelling complexes and components than those illustrated in FIG. 2A.

Central office 202 may include a site that houses telecommunication equipment, including switches, optical line terminals, etc. Central office 202 may provide telecommunication services to subscribers, such as telephone service, access to the Internet, cable television programs, etc., via optical line terminals. The optical line terminals may be assigned an identifier, herein referred to as an OLT ID, by an Operation Support System (OSS).

Dwelling units 204 may include apartments, condominiums, town houses, single detached houses, and/or other types of living units. Feeder optical fiber cables 206 may include optical fiber cable bundles that interconnect dwelling units 204 to optical line terminals in central office 202.

Figure 2B:
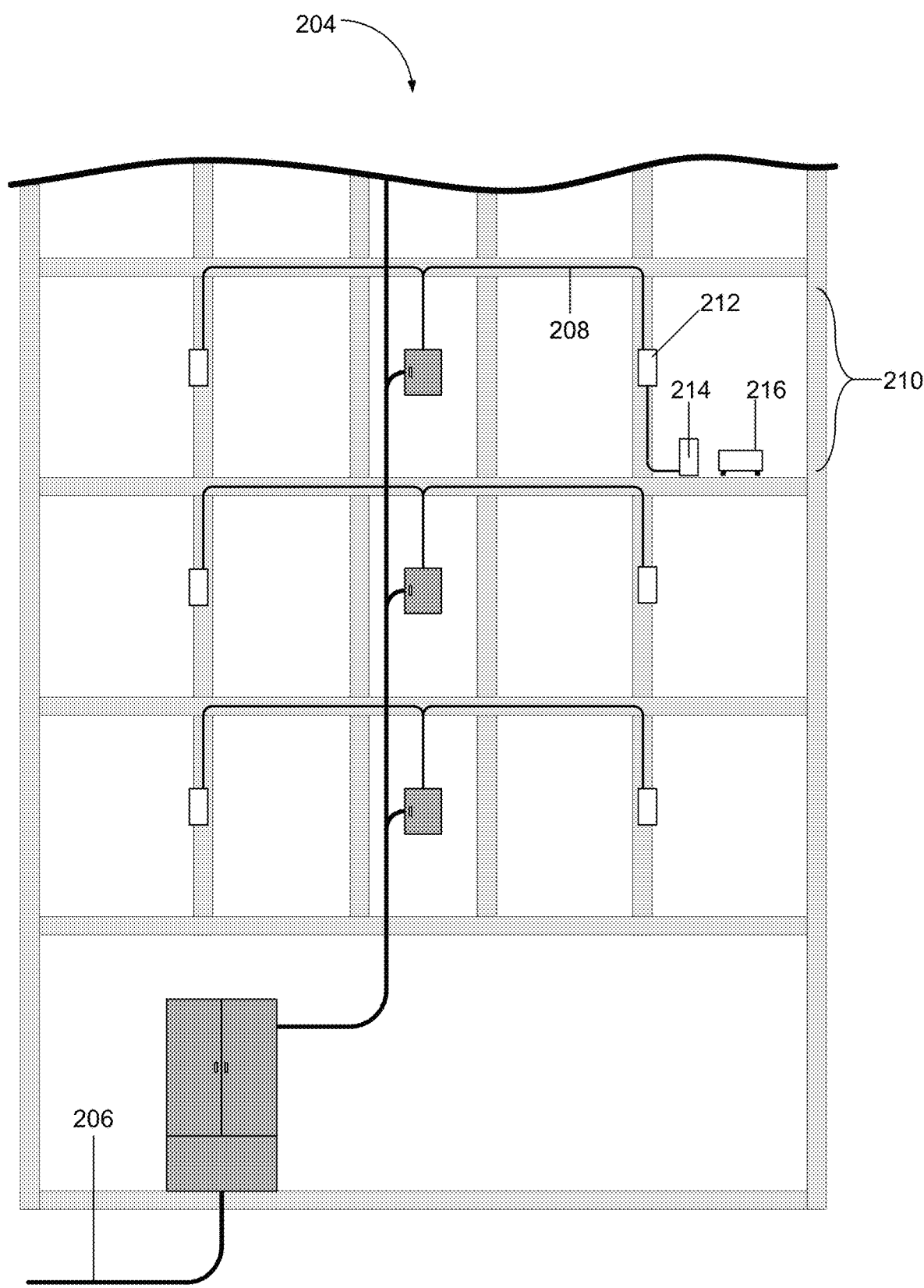
FIG. 2B depicts an exemplary dwelling unit of FIG. 2A.

FIG. 2B is a diagram of a portion of an exemplary dwelling unit 204. As shown, dwelling units 204 may include one or more of feeder optical fiber cable 206, drop cable 208, customer premises 210, optical network terminal (ONT) 212, and customer premises equipment (CPE) such as a gateway router (GWR) 214 and a set-top box (STB) 216. In FIG. 2B, some components of dwelling units 204 are omitted for the sake of simplicity (e.g., stairs, doors, elevators, etc.). In addition, depending on the implementation, dwelling units 204 may include additional, fewer, or different components than those illustrated in FIG. 2B.

Feeder optical fiber cable 206 splits into, through various fiber distribution components, drop cables 208. Drop cable 208 may include an optical fiber that carries optical signals from feeder optical fiber cable 206 to optical network terminal 212 through walls, floors, and/or other components of dwelling units 204.

Optical network terminal 212, which may also be called optical network translator 212, may receive optical signals via drop cable 208 and convert the received optical signals into electrical signals that are further processed or carried over, for example, wires to one or more living units 210. In some implementations, optical network terminal 212 may be placed within a living unit, and devices that use services offered by central office 202 may be directly connected to optical network terminal 212. Optical network terminal 212 may be associated with an identifier, herein referred to as an ONT ID. The ONT ID may have been assigned to optical network terminal 212 by the OSS.

Living unit 210 may include a partitioned space that a tenant or an owner of the living unit 210 may occupy. Living unit 210 may house devices that are attached directly or indirectly, via wires or Radio Frequency (RF) signals, to optical network terminal 212 to receive services that central office 202 provides. Such devices may include a gateway router (GWR) 214. Devices such as a set-top box (STB) 216 or a computer may connect to the gateway router 214 through wires or wirelessly. Gateway router 214 may be associated with an identifier, herein referred to as a GWR ID. The GWR ID may have been assigned to gateway router 214 by the OSS.

Figure 3:
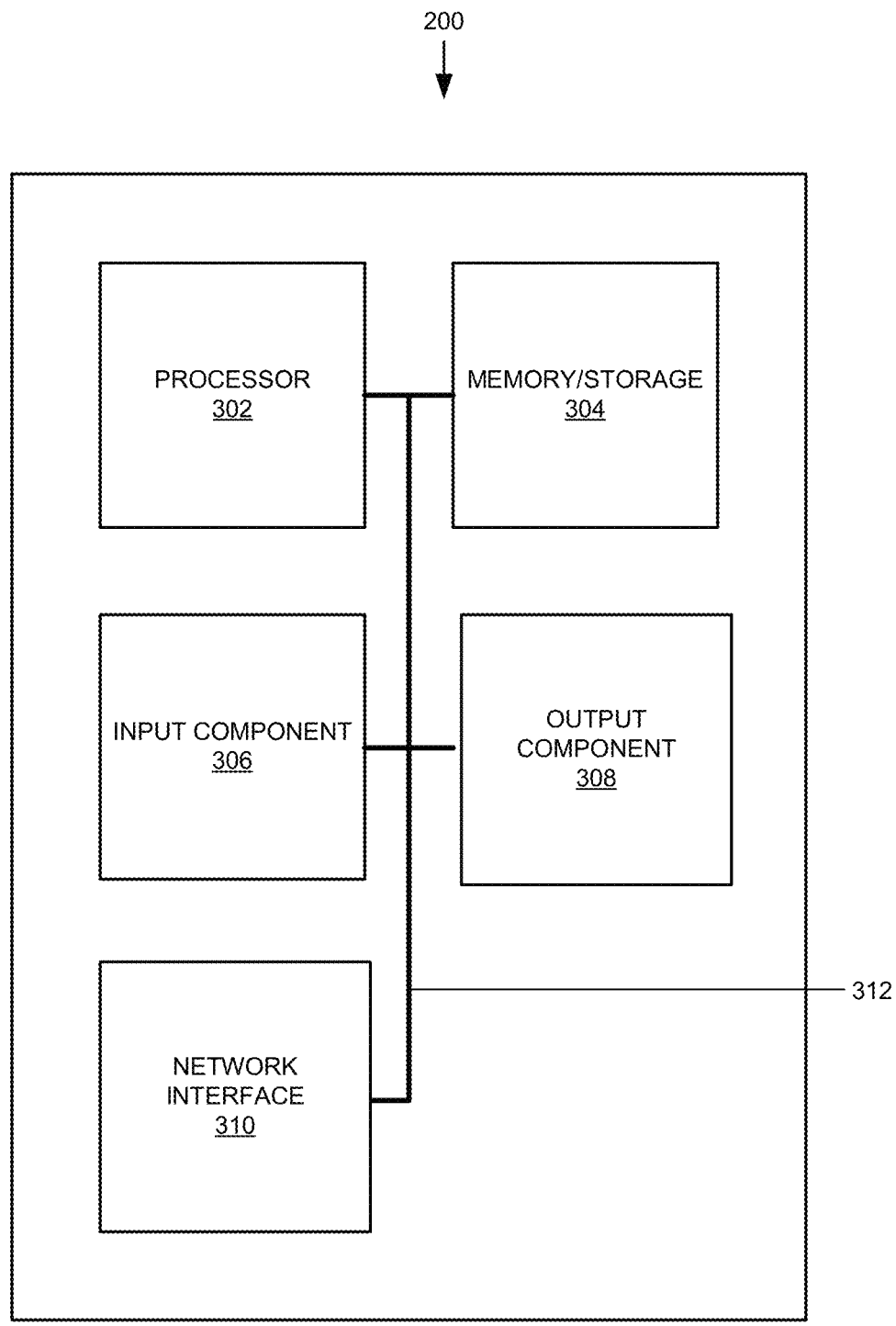
FIG. 3 illustrates exemplary components of network devices that are associated with the network environment of FIG. 1 and the dwelling unit of FIG. 2B.

FIG. 3 is a block diagram of exemplary components of a network device 300. Network device 300 may correspond to or be included in one or more of the devices and/or network components illustrated in FIG. 1, FIG. 2A, and/or FIG. 2B. Depending on the implementation, endpoints 102, data collectors 104, the data lake 106, the load balancer 108, and the network analyst 110 may be implemented on or hosted by one or more network devices 300. In some implementations, a single endpoint 102 may be instantiated for each network device 300.

As shown, network device 300 may include a processor 302, memory/storage 304, input component 306, output component 308, network interface 310, and communication path 312. In different implementations, network device 300 may include additional, fewer, different, or different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may provide input and output from/to a user to/from device 300. Input/output components 306 and 308 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (e.g., a WLAN, WIFI®, WIMAX®, etc.), a satellite-based network, optical network, etc. Network interface 310 may include a modem, an Ethernet interface to a LAN, and/or an interface/connection for connecting device 300 to other devices (e.g., a BLUETOOTH® interface).

Communication path 312 may provide an interface through which components of device 300 can communicate with one another.

Network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory/storage 304, when executed by processor 302, may cause processor 302 to perform processes that are described herein, such as functions performed by endpoints 102, data collectors 104, data lake 106, load balancer 108, and/or network analyst 110.

Figure 4:
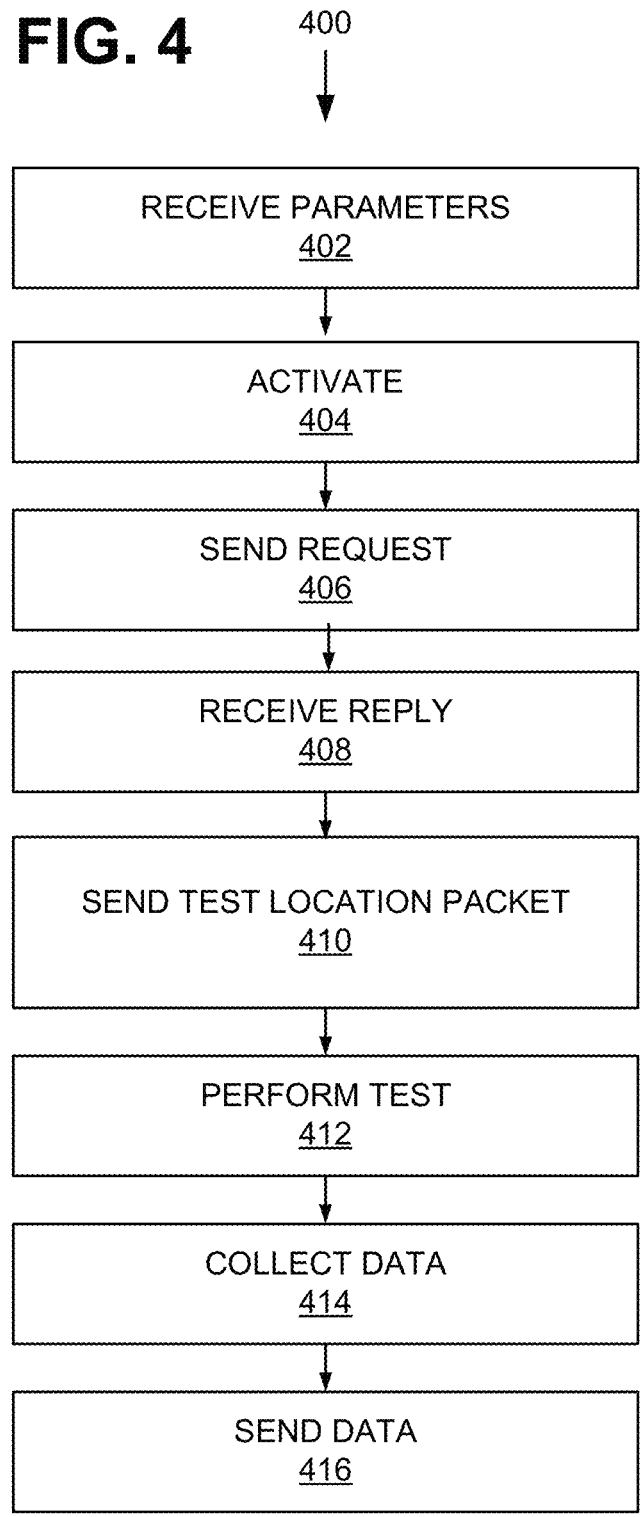
FIG. 4 is a flow diagram of an exemplary process that is associated with network testing performed by one or more components of FIG. 1.

FIG. 4 is a flow diagram of an exemplary process 400 that is associated with network testing performed by one or more components of FIG. 1, such as endpoints 102, data collectors 104, data lake 106, load balancer 108, and network analyst 110. As shown, process 400 may include an endpoint 102 receiving parameters that are necessary for its configuration or conducting tests (block 402). For example, an endpoint 102 may receive, from the OSS: a data collector port number (e.g., port 9000); a test location ID; an ONT ID; an OLT ID; a GWR ID; a test protocol (e.g., TCP, UDP, HTTP, SFTP, etc.); a results port; and/or other parameters.

Process 400 may further include activating an endpoint 102 (block 404). Depending on the particular use case, an endpoint 102 may be activated through a console command, by a Remote Procedure Call (RPC) from a remote host or the network analyst 110. When activated, the endpoint 102 may send a test request packet to a load balancer 108 (block 406).

Figure 5:
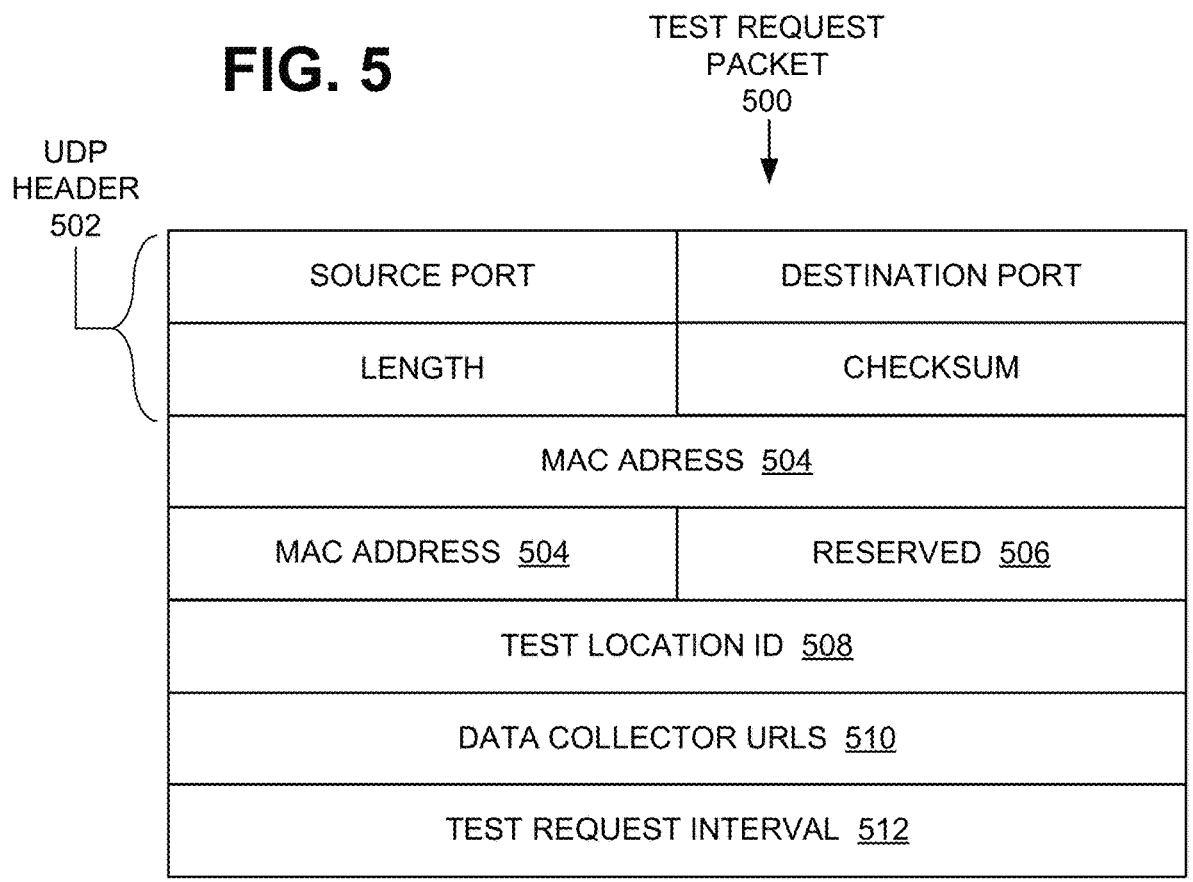
FIG. 5 illustrates an exemplary test request packet according to one implementation.

FIG. 5 shows an exemplary test request packet 500 according to one implementation. In this implementation, test packet 500 is formatted as a User Datagram Protocol (UDP) packet. In other implementations, a different packet format may be used. As shown, test request packet 500 may include a UDP packet header 502, a MAC address field 504, a reserved field 506, a test location ID field 508, a data collector URL field 510, and a test request interval field 512. UDP packet header 502 is a standard UDP packet header, and hence its description is omitted.

MAC address field 504 carries the MAC address of the endpoint 102 sending the request packet 500. Reserved field 506 is reserved for future use. Test location ID field 508 carries a location ID received by the endpoint 102 from the OSS. The test location ID identifies the geographical location of the endpoint 102. Data collector URL field 510 and Test Request Interval field 512 are left empty.

Returning to FIG. 4, when load balancer 108 receives the test request packet 500 from the endpoint 102, load balancer 108 constructs a reply UDP packet that includes the data collector URL field 510 and the test request interval field 512. To fill these fields, the load balancer 108 selects a particular data collector 104 and assigns the selected data collector 104 to the endpoint 102. Load balancer 108 may make the selection based on various network and device conditions, such as, for example, the current loads at data collectors 104 that are geographically close to the endpoint 102, network traffic, etc. In addition, load balancer 108 determines a test request interval based on endpoint 102's configuration. The test request interval indicates the time intervals at which endpoint 102 is to send diagnostics data to data collector 104. The data collector URL value and the test request interval value are inserted into their corresponding fields in the reply UDP packet, and load balancer 108 forwards the reply packet to the endpoint 102. The endpoint 102 receives the reply UDP packet (block 408).

After the receipt of the reply packet, endpoint 102 sends a test location packet to the assigned data collector 104 (block 410). The test location packet informs data collector 104 of endpoint 102 parameters.

Figure 6:
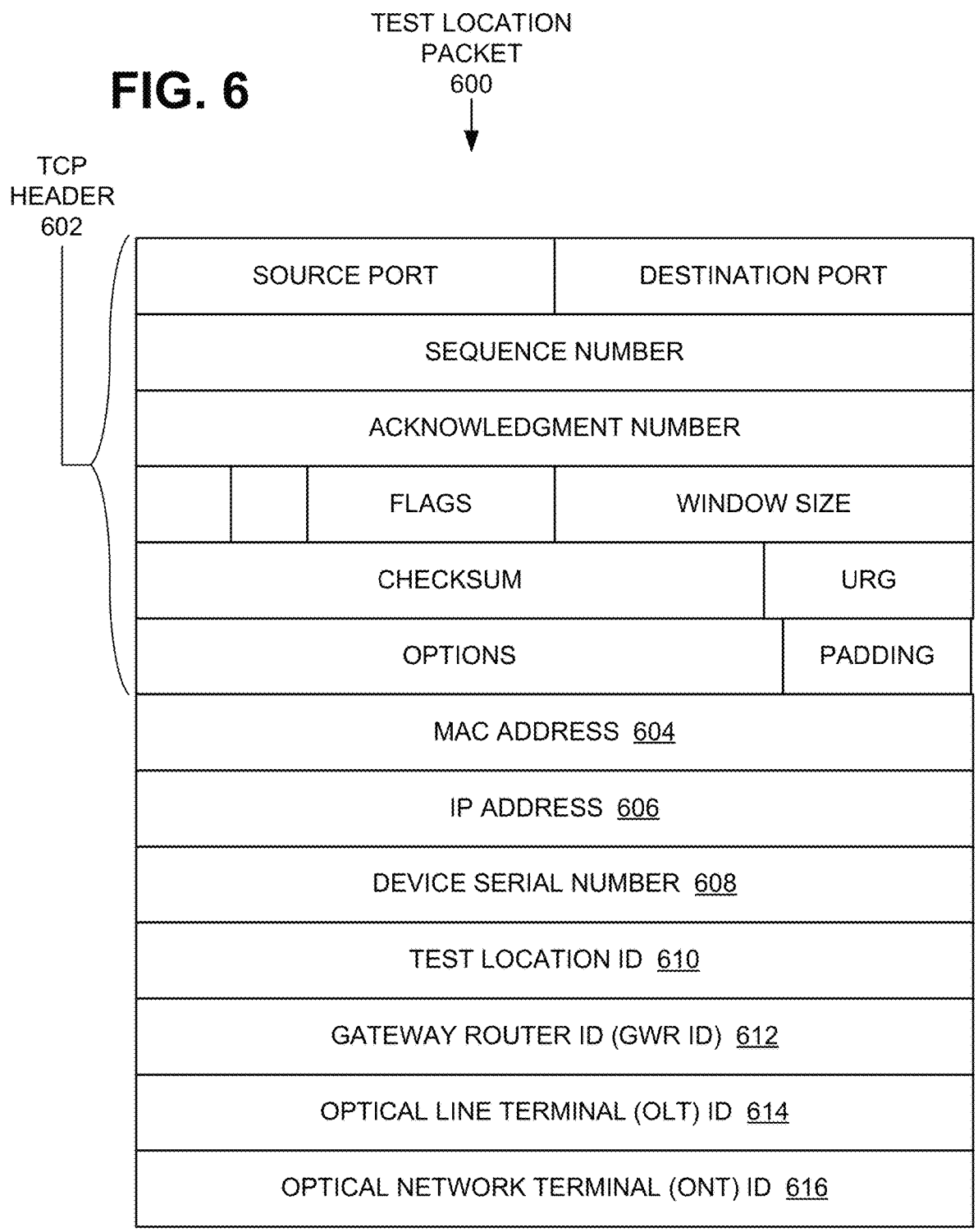
FIG. 6 illustrates an exemplary test location packet according to one implementation.

FIG. 6 illustrates an exemplary test location packet 600 according to one implementation. In this implementation, packet 600 has the format of a TCP packet (also referred to as a TCP segment). In other implementations, however, packet 600 may have a different format. As shown, test location packet 600 may include a TCP header 602, a MAC address field 604, an IP address field 606, a device serial number field 608, a test location ID field 610, a gateway router (GWR) ID field 612, an Optical Line Terminal (OLT) ID field 614, and an Optical Network Terminal (ONT) ID field 616. TCP header 602 is a standard TCP packet header, and hence its description is omitted.

MAC address field 604, IP address field 606, and device serial number field 608 may include, respectively, the MAC address of the device hosting the endpoint 102, the IP address of the endpoint 102, and the serial number of the host device. Test location ID field 610 may include the test location ID received from the OSS. GWR ID field 612, OLT ID field 614, and ONT ID field 616 may include, respectively, the GWR ID, the OLT ID, and the ONT ID that the endpoint 102 received from the OSS.

Returning to FIG. 4, the endpoint 102 and the data collector 104 may perform one or more tests (block 412). Depending on implementation, the endpoint 102 and the data collector 104 may perform different types of tests.

FIG. 7 illustrates a table of exemplary tests that may be performed by an endpoint 102 and by the corresponding data collector 104. As shown, possible tests include: an HTTP test 702, a TCP test 704, a UDP test 706, a TCP Theoretical Maximum Throughput (TMT) test 708, and a UDP TMT test 710. These tests may continue to run until data collector 104 stops responding to the endpoint 102. When endpoint 102 detects a problem, endpoint 102 may continue to probe data collector 104 for a predetermined time interval. After a threshold number of failed attempts to connect to data collector 104, endpoint 102 may send another test request packet to load balancer 108 to check on the status of the failed data collector 104 and to request a new data collector 104 assignment.

HTTP test 702, TCP test 704, and UDP test 706 may include upload and download tests, respectively, of HTTP messages, TCP segments, and UDP packets. As shown, these tests may be intrusive, semi-intrusive, and highly intrusive to the operation of the device on which the endpoint 102 is installed.

HTTP test 702 may be intrusive for when requested on demand. HTTP GET/PUT is used by the endpoint 102 to satisfy the test requirement. The test is time based (for a specific duration) or a size based (for specific amount of file to download and upload).

TCP test 704 involves a connection between an endpoint 102 and the data collector 104. The test is performed using bit streams under the TCP using variable length data sets to achieve the highest possible throughput values. The total data transmitted may be set to a predetermined value. Because TCP test 704 is semi-intrusive, the test 704 may be used when inconclusive test results are returned by non-intrusive tests.

UDP test 706 may be used in conjunction with TCP/HTTP tests 704, 702. When performed, UDP test 706 may saturate the communication path to reach the maximum number of transmission packets, without taking into account the background traffic and the user generated traffic. Accordingly, the test 706 may be highly intrusive and may result in performance issues for the user during the test 706.

TCP TMT test 708 may obtain theoretical throughput values. Each of these may be obtained based on transmitting and receiving a single IP packet from a source to the destination. In a single test cycle, the test 708 may use multiple data sets for validity and repeatability of the network conditions. The test 708 may identify anomalies and outliers based on the data sets and present throughput values. Within a cycle, each test iteration may be associated with a header that includes attributes (e.g., expected number of packets, host/server identifiers, etc.) and a trailer which summarizes the test result. Data collector 104 may calculate the results and average them through the entire test cycle. More specifically, data collector 104 may use a TMT calculation algorithm to identify the maximum throughput during a particular test cycle. According to one implementation, a formula for calculating the TCP TMT is given by the expression:

$$\text{Throughput} = \text{Total Bytes Received} \times 8/(\text{BOM}-\text{EOM})/1{,}000{,}000 \quad (1)$$

In expression (1), BOM and EOM correspond to the time of the beginning of measurement and the time of the end of measurement.

UDP TMT test 710 may provide the same level of throughput measurements at client and server sides. At the start of test 710, the client may establish a connection to the server and provide details of each test iteration via a header that indicates the number of packets in the transmission queue and the queue size. The header may also include packet sequence numbers generated by the client.

With receipt of the header information, the server has details of the buffer size, the number of packets expected during the test iteration, and the order of the packets. When all UDP packets have been transmitted to the server, the server may assess the number of packets received and may compare the results with information provided in the header packet. If discrepancies are detected during the test, the server may notify the client by sending a trailer packet that indicates the number of bits/Bytes/packets received, the order in which the packets were received, and the packet loss.

UDP TMT test 710 is different from TCP TMT test 708. For example, UDP TMT test 710 is less resource intensive than TCP TMT test 708. UDP TMT test 710 may not significantly contribute to the congestion of the line. The expression for computing the throughput for UDP TMT test is the same expression (1) for the TCP TMT test 708.

Referring back to FIG. 4, endpoint 102 may send data to data collector 104. Data collector 104 may receive information from endpoint 102 and perform calculations, to obtain data (block 414). Data collector 104 may then transmit the obtained data to data lake 106 (block 416) for use by network analyst 110. The obtained data may include not only the test results (e.g., TMT throughput values), but also a number of parameters for bookkeeping purposes. FIG. 8 illustrates exemplary parameters that data collector 104 may send to the data lake 106. As shown in FIG. 8, the parameters may include: a MAC address 802, an IP address 804, an ONT ID 806, an OLT ID 808, a GWR ID 810, a download 812, an upload 814, a Beginning of measurement (BOM) 816, the End of Measurement (EOM) 818, a send buffer size 820, a receive buffer size 822, packets sent 824, packets received 826, a direction 828, a status 830, and latency 832. In different implementations, data collector 104 may send additional, fewer, or different parameters than those shown in FIG. 8.

MAC address 802 and IP address 804 may include, respectively, the MAC address of the device hosting the endpoint 102 and the IP address of the endpoint 102. The data collector 104 may send MAC address 802 and IP address 804 as, respectively, an unsigned integer and a string to the data lake 106. ONT ID 806, OLT ID 808, and GWR ID 810 are the Optical Network ID, Optical Line Terminal ID, and the Gateway Router ID that the endpoint 102 received from the OSS. These IDs are sent by data collector 104 to data lake 106 as unsigned integers. As described above with reference to FIGS. 2A and 2B, the OLT ID 808 is associated with the optical line terminal from which the optical fiber connecting to the endpoint device originates; the ONT ID is associated with the optical network terminal that is connected to the optical fiber from the OLT; and the GWR ID is associated with the CPE connected to the ONT.

Download 812 and upload 814 include the upload and download speeds determined based on the number of bits transmitted and received by endpoint 102 and data collector 104. In one implementation, download 812 and upload 814 are sent as strings that express the speeds in MB/S.

BOM 816 and EOM 818 indicate the dates and the times at which, respectively, the first packet and the last packet of the test were transmitted by endpoint 102 and data collector 104. Send buffer 820 and receive buffer 822 indicate the sizes of the transmission buffer and the receive buffer at the client and the server, as unsigned integers. Packets sent 824 and packets received 826 include the number of packets sent and received, respectively, at the client and the server, as unsigned integers.

Direction 828 may indicate the direction (e.g., "UPLOAD" or "DOWNLOAD") in which the test packets were sent to/from the client or the server. Status 830 may indicate, as a string, the result of a test. Possible values for status 830 include: Completed Status, Initialization Error, and Processing Error. The Completed Status indicates that the test has been performed without any error. The Initialization Error Status indicates that the test has been completed but with initialization errors. The Processing Error Status indicates that the test has failed during processing of the packets by the client or the server. Latency 832 may indicate, as an unsigned integer, the total round trip time (RTT) of the test packets. The RTT may be calculated using SYN and SYN-ACK packets.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIG. 4, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a,"

"an," and "the" are intended to include one or more items. Further, the phrase "based on" is intended to mean "based, at least in part, on" unless explicitly stated otherwise.

What is claimed is:

1. A network device comprising:
a processor configured to:
receive, from a management device, one or more parameters for testing the network device via an optical network terminal (ONT) coupled to the network device;
receive a network address of a load balancer device from the management device;
send a test request that includes a User Datagram Protocol (UDP) packet carrying a Media Access Control (MAC) address of the network device to the load balancer device based on the received network address;
obtain a network address of a data collector device from the load balancer device, wherein the data collector device has been selected by the load balancer device to balance loads across multiple data collector devices, and wherein the multiple data collector devices include the data collector device; and
perform, via the ONT, a test with the data collector device,
wherein the data collector device is to:
obtain a result of the test; and
send the result to a data lake.

2. The network device of claim 1, wherein the test includes at least one of:
an upload from the network device to the data collector device; or
a download to the network device from the data collector device.

3. The network device of claim 1, wherein the test includes one or more of:
a Hypertext Transfer Protocol (HTTP) test;
a User Datagram Protocol (UDP) test;
a Transport Control Protocol (TCP) test;
a TCP Maximum Throughput test; or
a UDP Maximum Throughput test.

4. The network device of claim 1, wherein when the processor performs the test, the processor is configured to:
send, to the data collector device, a test header packet that indicates a number of packets to be sent from the network device to the data collector device and packet sequence numbers associated with the packets.

5. The network device of claim 1, wherein the processor is further configured to:
receive, from the data collector device, a trailer packet that indicates a number of packets that the data collector device received from the network device, an order in which the packets were received, and packet loss.

6. The network device of claim 1, wherein the parameters further comprise a location identifier associated with a geographical location of the network device.

7. The network device of claim 6, wherein the processor is to:
send, to the data collector device, a test location packet that includes the location identifier.

8. The network device of claim 1, wherein the parameters further comprise identifiers for a gateway router and an optical line terminal,
wherein the optical line terminal is connected to the ONT by an optical fiber,
wherein the ONT is connected to the gateway router, and
wherein the network device is connected to the gateway router.

9. A method comprising:
receiving, from a management device, one or more parameters for testing a network device via an optical network terminal (ONT) coupled to the network device;
receiving a network address of a load balancer device from the management device;
sending a test request that includes a User Datagram Protocol (UDP) packet carrying a Media Access Control (MAC) address to the load balancer device based on the received network address;
obtaining a network address of a data collector device from the load balancer device, wherein the data collector device has been selected by the load balancer device to balance loads across multiple data collector devices, and wherein the multiple data collector devices include the data collector device; and
performing, via the ONT, a test with the data collector device,
wherein the data collector device is configured to:
obtain a result of the test; and
send the result to a data lake.

10. The method of claim 9, wherein the test includes at least one of:
an upload to the data collector device; or
a download to from the data collector device.

11. The method of claim 9, wherein the test includes one or more of:
a Hypertext Transfer Protocol (HTTP) test;
a User Datagram Protocol (UDP) test;
a Transport Control Protocol (TCP) test;
a TCP Maximum Throughput test; or
a UDP Maximum Throughput test.

12. The method of claim 9, wherein performing the test includes:
sending, to the data collector device, a test header packet that indicates a number of packets to be sent to the data collector device and packet sequence numbers associated with the packets.

13. The method of claim 9, wherein the data collector device is further configured to:
send a trailer packet that indicates a number of packets received, an order in which the packets were received, and packet loss.

14. The method of claim 9, wherein the parameters further comprise a location identifier associated with a geographical location.

15. The method claim 9, wherein the parameters further comprise identifiers for a gateway router and an optical line terminal,
wherein the optical line terminal is connected to the ONT by an optical fiber, and
wherein the ONT is connected to the gateway router.

16. A non-transitory computer-readable medium comprising computer executable instructions, wherein the instructions, when executed by a processor in a network device causes the processor to:
receive, from a management device, one or more parameters for testing the network device via an optical network terminal (ONT) coupled to the network device;
receive a network address of a load balancer device from the management device;
send a test request that includes a User Datagram Protocol (UDP) packet carrying a Media Access Control (MAC)

address of the network device to the load balancer device based on the received network address;
obtain a network address of a data collector device from the load balancer device, wherein the data collector device has been selected by the load balancer device to balance loads across multiple data collector devices, and wherein the multiple data collector devices include the data collector device; and
perform, via the ONT, a test with the data collector device, wherein the data collector device is to:
obtain a result of the test; and
send the result to a data lake.

17. The non-transitory computer-readable medium of claim 16, wherein the test includes at least one of:
an upload from the network device to the data collector device; or
a download to the network device from the data collector device.

18. The non-transitory computer-readable medium of claim 16, wherein the test includes one or more of:
a Hypertext Transfer Protocol (HTTP) test;
a User Datagram Protocol (UDP) test;
a Transport Control Protocol (TCP) test;
a TCP Maximum Throughput test; or
a UDP Maximum Throughput test.

19. The non-transitory computer-readable medium of claim 16, wherein the parameters further comprise a location identifier associated with a geographical location.

20. The non-transitory computer-readable medium of claim 16, wherein the parameters further comprise identifiers for a gateway router and an optical line terminal,
wherein the optical line terminal is connected to the ONT by an optical fiber, and
wherein the ONT is connected to the gateway router.

* * * * *